US007845570B2

(12) United States Patent
Schwenk et al.

(10) Patent No.: US 7,845,570 B2
(45) Date of Patent: Dec. 7, 2010

(54) VALUE DOCUMENT

(75) Inventors: Gerhard Schwenk, Puchheim (DE); Thomas Giering, Kirchseeon (DE); Gerhard Stenzel, München (DE); Wittich Kaule, Emmering (DE)

(73) Assignee: Giesecke & Devrient GmbH, Munich (DE)

( * ) Notice: Subject to any disclaimer, the term of this patent is extended or adjusted under 35 U.S.C. 154(b) by 1030 days.

(21) Appl. No.: 10/574,838

(22) PCT Filed: Oct. 5, 2004

(86) PCT No.: PCT/EP2004/011127

§ 371 (c)(1),
(2), (4) Date: Dec. 11, 2006

(87) PCT Pub. No.: WO2005/036477

PCT Pub. Date: Apr. 21, 2005

(65) Prior Publication Data

US 2007/0158433 A1 Jul. 12, 2007

(30) Foreign Application Priority Data

Oct. 8, 2003 (DE) ................................ 103 46 634

(51) Int. Cl.
*G06K 19/06* (2006.01)

(52) U.S. Cl. ........................ 235/494; 235/491; 235/487; 283/72; 283/73; 283/85; 283/114

(58) Field of Classification Search ................. 235/494, 235/491, 487; 283/72, 73, 85, 114
See application file for complete search history.

(56) References Cited

U.S. PATENT DOCUMENTS

| | | | | |
|---|---|---|---|---|
| 6,155,605 | A * | 12/2000 | Bratchley et al. | 283/72 |
| 6,244,508 | B1 | 6/2001 | Straub | |
| 6,530,527 | B1 * | 3/2003 | Ahlers et al. | 235/491 |
| 6,786,954 | B1 * | 9/2004 | Lee et al. | 106/31.13 |
| 2002/0188845 | A1 * | 12/2002 | Henderson et al. | 713/168 |
| 2005/0052519 | A1 | 3/2005 | Mayer et al. | |

FOREIGN PATENT DOCUMENTS

| | | |
|---|---|---|
| DE | 39 00 056 | 7/1989 |
| DE | 101 20 818 | 10/2002 |
| DE | 101 49 265 | 4/2003 |
| EP | 0 052 624 | 6/1982 |
| EP | 0 053 124 | 6/1982 |
| EP | 0 659 935 | 6/1995 |
| EP | 0 854 451 | 7/1998 |
| EP | 1 182 048 | 2/2002 |
| WO | WO 97/39428 | 10/1997 |

* cited by examiner

*Primary Examiner*—Allyson N Trail
(74) *Attorney, Agent, or Firm*—Bacon & Thomas, PLLC

(57) ABSTRACT

The invention relates to a value document, in particular a bank note, having a value document substrate and at least three different feature substances for checking the value document, which has a first feature substance, and wherein second and third feature substances are applied to the value document substrate in a printing ink jointly. The second feature substance is formed by a luminescent substance, and the third feature substance by a material absorbent in a special spectral range.

40 Claims, 2 Drawing Sheets

VALUE DOCUMENT

FIELD OF THE INVENTION

This invention relates to a value document, in particular a bank note, having a value document substrate and at least three different feature substances for checking the value document.

BACKGROUND OF THE INVENTION

The print WO 97/39428 discloses a value document whose substrate has, in one area, different machine authenticatable authenticity features for different security levels. The value document contains a machine authenticatable low security feature which is formed from a single material. Upon an interrogation the low security feature provides a yes/no response indicating the presence or absence of the interrogated property. The low security feature is used for authenticity checking in applications where a simple detector is used, for example retail outlets.

A further, likewise machine authenticatable high security feature has properties that are difficult to detect allowing an in-depth interrogation of the value document and a much higher level of authentication. The check of the high security feature is elaborate and effected for example in central banks. Said high security feature is a homogeneous mixture of two substances with different physical properties, such as the excitation wavelength for a luminescence emission or coercivity, etc.

The system known from WO 97/39428 has the disadvantage, however, of permitting an elaborate authenticity check of the value documents but not allowing any statement about the type or value of the particular value document. For machine processing of value documents, in particular of bank notes, it is also desirable to detect by machine the type of document, e.g. the currency or the denomination of a known currency.

SUMMARY OF THE INVENTION

On these premises the invention is based on the problem of proposing a generic value document that involves not only increased falsification security but at the same time also a possibility of value recognition.

Value recognition is understood in the context of the present invention to mean the evaluation of information present in coded form for a certain user group. The coded information can be, in the case of a bank note, for example the denomination, the currency, the series, the issuing country or other special features of the bank note.

The inventive value document has a first feature substance as well as second and third feature substances, the second and third feature substances being applied to the value document substrate in a printing ink jointly. The second feature substance is formed by a luminescent substance, and the third feature substance by a material absorbent in a special spectral range. As explained in detail hereinafter, this combination creates a complex feature system that is very difficult to imitate for a forger. The feature system permits users from different user groups to each carry out both an authenticity check and value recognition on the document.

For example, users of one user group can use a characteristic property of the first feature substance for the authenticity check, while users of another user group can employ a characteristic property, in particular the luminescence of the second feature substance, for the authenticity check. Both user groups can use the absorbent material for value recognition to be able to carry out not only the authenticity check but also value recognition without any great additional effort. The exact implementation of the authenticity check and the value recognition will be described in detail below.

Said user groups may be central banks, commercial banks, any commercial enterprises such as local train services, department stores or vending machine operators, etc.

Analysis of the total feature system is exceptionally difficult and elaborate, since it is not recognizable to third parties which substances and in particular which substance properties are used for the check by the different user groups. Even knowledge of the procedure of one user group does not readily indicate the substances and methods used for the authenticity check and value recognition by the other user group or groups.

According to a preferred embodiment of the invention, the first feature substance is incorporated in the near-surface area of the value document substrate. The distribution of the first feature substance can be orderly and form a given structure. For example, a stripe structure of the feature substance can form a coding, as described in detail below. For incorporating the feature into the near-surface area of a paper substrate, suitable methods are for example those described in the prints EP-A-0 659 935 and DE 101 20 818, in which the particles of the first marking substance are admixed to a gas stream or a liquid stream and incorporated into a wet paper web. The disclosures of the stated prints are included in the present application in this respect.

According to another preferred embodiment, the first feature substance is distributed substantially uniformly within the volume of the value document substrate, so that sufficiently large volume elements of equal size each contain a substantially equal quantity of the first feature substance. The distribution can be regular, and be effected for example in a given regular pattern. However, the first feature substance is preferably incorporated into the substrate volume with a random distribution. If paper is used as the value document substrate, the feature substance is preferably added to the paper stock before sheet formation.

The third feature substance selected is preferably a feature substance absorbent in the infrared spectral range. "Infrared spectral range" is understood according to the invention to be the wavelength range from 750 nm and more, preferably 800 nm and more. The third feature substance is preferably substantially colorless or has only weak inherent color in the visible spectral range. The third feature substance is then not recognizable or not very striking under ordinary lighting conditions. Furthermore, unlike luminescent substances for instance, the infrared absorbent feature substance does not provide an active signal that would facilitate analysis of the used substance.

In one embodiment of the invention, the third feature substance does not yet have significant absorption even at a wavelength of about 800 nm, so that it cannot be detected with commercially available silicon-based infrared detectors. The third feature substance preferably has significant absorption only in the spectral range above about 1.2 μm, preferably in the spectral range between about 1.5 μm and about 2.2 μm. The infrared absorption of the third feature substance is in this case only detectable with elaborate and uncommon detectors.

In preferred embodiments of the invention, the infrared absorbent feature substance used is for example a substance based on doped semiconductor material. Substances containing a metal oxide are also suitable, being characterized in particular by their aging resistance. The third feature substance is preferably present in particle form with an average particle size smaller than 50 nm. This causes visible light to be scattered only little by the particles, so that the feature substance is colorless or has only weak inherent color in the visible.

Examples of the infrared absorbers to be used in the invention, which do not have any appreciable absorption either in the visible or at about 800 nm, are 2,5-cyclo-hexadiene-1,4-diylidene-bis[N,N-bis(4-dibutylaminophenyl)ammonium] bis(hexa-fluoroantimonate) with the totals formula $C_{62}H_{92}N_6F_{12}Sb_2$, the dyes ADS 990 MC with the totals formula $C_{32}H_{30}N_2S_4Ni$, or ADS 1120P with the totals formula $C_{52}H_{44}Cl_2O_6$ from Siber Hegner GmbH, Hamburg.

According to an advantageous development of the invention, the value document has a fourth feature substance which is preferably incorporated into the substrate of the value document like the first feature substance. The fourth feature substance can be used for the authenticity check of the value document in addition or as an alternative to the first feature substance. The distribution of the fourth feature substance within the substrate can form a given structure, or be uniform and in particular have a random distribution.

In a preferred embodiment of the invention, the presence of a first and/or fourth feature substance indicates the series or the particular existing upgrade e.g. of a bank-note issue. For example, only the first feature substance can be present in an onginally issued currency, and the first and fourth feature substances in the upgrade of the currency. After a certain transition period it is conceivable to use only the fourth feature substance.

Besides the second feature substance, the first feature substance and/or the fourth feature substance can also advantageously be formed by a luminescent substance or a mixture of luminescent substances. For said feature substances it is preferable to use luminescent substances or mixtures that emit in the infrared spectral range and that in particular have a complex, difficult-to-imitate spectral emission characteristic. Said emission characteristic can be used in particular for distinguishing the luminescent substances from similar luminescent substances. However, it can also be used for producing a coding by the form of the emission spectra and/or excitation spectra of the luminescent substances.

In an expedient embodiment of the inventive value document, the third feature substance is formed by an infrared absorbent feature substance, and the first and/or fourth feature substance by a luminescent substance emitting in the absorption range of the third feature substance. This makes it possible to utilize the interaction of the properties of the luminescent substance and the third feature substance for reading the coding, as described in detail below.

If feature substances used are luminescent substances, at least one of the luminescent feature substances is preferably a luminescent substance based on a host lattice doped with rare earth elements. It is also possible for several or all of the luminescent substances to be formed on the basis of such a doped host lattice. Said luminescent substances can be excited e.g. by irradiating directly into the absorption bands of the rare earth ions. In preferred variants, it is also possible to use absorbent host lattices or so-called sensitizers, which absorb the excitation radiation and transfer it to the rare earth ion, which then emits the luminescence. Obviously, the host lattices and/or the dopants can be different for the different feature substances in order to obtain different excitation and/or emission ranges.

In a preferred embodiment, the host lattice absorbs in the visible spectral range and optionally, in particular in the case of the first or fourth feature substance, additionally in the near infrared region up to about 1.1 μm. Excitation can then be performed with high effectiveness by light sources, such as halogen lamps, LEDs, lasers, flash lamps or xenon arc lamps, so that only small amounts of the luminescent substance are required. This permits for example an application of the luminescent substance by usual printing processes. Also, the small amount of substance impedes detection of the used substance by potential forgers. If the host lattice absorbs in the near infrared up to about 1.1 μm, easily detectable emission lines of the rare earth ions can be suppressed, leaving only the emission at larger wavelengths that is more elaborate to detect.

In an alternative preferred embodiment, luminescent substances are used that absorb even in the visible spectral range, preferably over most of the visible spectral range, especially preferably into the near infrared region. Then, too, emissions in these more easily accessible spectral ranges are suppressed.

The host lattice can have for example a perovskite structure or a garnet structure and be doped with a rare earth element emitting in the infrared spectral range, such as praseodymium, neodymium, dysprosium, holmium, erbium, thulium or ytterbium. Further possible embodiments of the host lattice and the dopant are specified in EP-B-0 052 624 or EP-B-0 053 124, whose disclosures are included in the present application in this respect.

In a further advantageous embodiment, the first and/or fourth feature substance is printed on the value document substrate. The printing process to be used here may be for example gravure, screen, letterpress, flexographic or offset printing. The printing inks can contain coloring pigments which particularly preferably have transparent areas in the absorption and emission ranges of the feature substances. A certain absorption by the printing ink is of course also tolerable as long as the signals of the feature substances are not completely attenuated. The absorption by the printing ink is preferably less than 50%.

According to a preferred development of the invention, the first and/or fourth feature substance are applied to or incorporated in the value document substrate in the form of a coding to further increase the falsification security of the value document.

The second and third feature substances are advantageously also printed on the value document substrate in the form of a coding. The printing inks used here can also contain further coloring pigments which, as explained above, particularly preferably have transparent areas in the absorption and emission ranges of the feature substances. Besides increased falsification security, the coded application of the third feature substance allows simple and reliable value recognition on the document.

The codings formed by the first feature substance, the fourth feature substance or the second and third feature substances can involve any kind of signs or patterns, such as an alphanumeric character string. Preferably, at least one of the codings is a bar code. A bar code is understood here to mean any one- or two-dimensional pattern consisting of stripes or areas with the feature substances ("bars") and stripes or areas without feature substances located between the bars ("spaces"). As a rule, the bar/space sequence represents a binary number sequence representing any, also encrypted, information about the value document.

The bar code can in particular be invisible to the naked eye and be only detectable by its emission or absorption in a special spectral range after irradiation with a suitable light source. Bar codes are particularly suitable for machine readout and provide an almost fault-free read result, primarily in connection with check digits. Bar codes to be used are for example common formats, such as the 2/5 code, the 2/5 interleaved code, the 128 code or the 39 code, but also special formats used only for the inventive value documents. It is also possible to use two-dimensional bar codes offering a particularly strongly condensed recording and increased redundancy, which makes them less sensitive to production tolerances.

If several codings are formed on the value document, they can be of the same type or of different types. For example, the first marking substance can be incorporated into the substrate with a stripe structure in the form of a bar code, the second and third feature substances printed in the form of a further bar code, while the fourth feature substance is printed in the form of an alphanumeric character string.

It is preferably provided that at least one of the codings extends over a predominant part of a surface of the value document, in particular over the substantially total surface of the value document. This makes it possible to obtain a further increase in the falsification security of the value document, since gaps or inserted parts of other, including other authentic, documents manifest themselves as a disturbance in said coding.

For example, in the case of documents of the same kind, such as bank notes of the same denomination, such a coding or a part thereof can be provided with a certain offset from document to document. If the documents are produced in a continuous format, this can be obtained for instance by using a print roll whose circumference is a non-integral multiple of the document size. A row of successive documents can then contain a coding with the same content or the same form, the individual documents at the same time being distinguishable from each other due to the different offset. In sheet-by-sheet printing the same result can be achieved if several printing plates with mutually offset codings or coding parts are used according to the desired repetition rate.

The value document substrate is preferably a printed or unprinted cotton fiber paper, cotton/synthetic fiber paper, a cellulosic paper, or a coated, printed or unprinted plastic film. A laminated substrate can also be used. The material of the substrate is not essential to the invention, provided that it only allows incorporation or application of the particular feature substances required.

The inventive value documents are preferably bank notes, shares, credit cards, badge or identity cards, passports of any type, visas, vouchers, etc.

The application of the second and third feature substances to the value document substrate is done according to the invention with a printing process, using for example a gravure, screen, letterpress, flexographic, ink-jet, digital, transfer or offset printing process.

In an advantageous development of the invention, the value document has a further printed layer which partly or completely covers the areas of the value document provided with the second and third feature substances. In particular, the printed layer can be opaque in the visible spectral range, and transparent or translucent in the emission range of the second feature substance and/or in the absorption range of the third feature substance. The printed layer then hides the presence of the second and third feature substances in the visible spectral range, but permits detection of the luminescence of the second feature substance or the absorption of the third feature substance at the corresponding wavelengths. If the printed layer completely covers the value document areas provided with the second and third feature substances, it must be transparent or translucent both in the emission range of the second feature substance and in the absorption range of the third feature substance to permit detection of the particular feature properties.

Obviously, further feature substances can be applied, or incorporated into the substrate, e.g. to further increase the falsification security or to include further user groups.

In a method for checking or processing an above-described value document, the authenticity of the value document is checked and a value recognition of the document carried out by using at least one characteristic property of the first and/or second feature substance for checking the authenticity of the value document, and the absorption of the third feature substance for value recognition of the value document. The authenticity of the value document is preferably determined by users of different user groups using different feature substances. This means that if the user belongs to a first user group, the authenticity of the value document is determined using the first feature substance. If the user belongs to a second user group, said user has at its disposal the characteristic property of the second feature substance for authenticity recognition.

However, both user groups carry out value recognition using the absorption properties of the third feature substance.

If the value document is provided with a fourth feature substance, the check or processing by a user of the first user group can be done by using at least one characteristic property of the first and/or fourth feature substance for checking the authenticity of the value document. For example, some of the users from the first user group can use the first feature substance for the authenticity check, and others the fourth feature substance.

In both method variants, value recognition is preferably done by irradiating at least a partial area of the value document with radiation from the absorption range of the third feature substance, determining the absorption of the third feature substance in the partial area at a wavelength from the irradiation range, and performing the value recognition on the basis of the determined absorption.

Irradiation is advantageously done here in the infrared spectral range, and the absorption is expediently determined by a spatially resolved measurement of the transmitted and/or remitted infrared radiation.

If the first and/or fourth feature substance is formed by a luminescent substance which emits in the absorption range of the third feature substance, the value recognition can also be effected by irradiating at least a partial area of the value document with radiation from the excitation range of the luminescent first and/or fourth feature substance, determining the emission of the first and/or fourth feature substance at a wavelength from the absorption range of the third feature substance, and performing the value recognition on the basis of the determined emission. In a preferred embodiment, the third feature substance does not absorb at a certain emission wavelength of the first feature substance, while it absorbs at least part of the emission radiation at a certain emission wavelength of the fourth feature substance. The emission of the first feature substance at a certain wavelength is thus the expected 100%, while the emission of the fourth feature substance at another certain wavelength is e.g. 50% based on the expected 100%. A certain absorber can thus be easily detected with the help of these special emission and absorption characteristics in the total spectrum. It thus does not suffice to use any absorbent substance in the forgery, the absorber must also have a very specific spectrum that interacts with the spectrum of the first and/or fourth feature substance.

This alternative variant is based on an interaction between the properties of the first or fourth and the third feature substance. The absorption of the third feature substance is not determined via a remission or transmission measurement, as in the above-described method, but via the suppressed luminescence emission of the first or fourth feature substance in the areas provided with the third feature substance.

In this variant, too, irradiation is preferably done in the infrared spectral range, for example at 0.8 μm to 1.0 μm, and the emission is measured in spatially resolved fashion for detecting the local absorption.

The described method additionally allows a normalization of the measured emission pattern. If the absorbent coding print is located on the front of the value document, the luminescence emission on the back is measured along with the absorption modulated luminescence emission on the front. The value document is irradiated with excitation light from the back, and the substantially constant back emission of the first and/or fourth marking substance taken as a reference value. The front emission can then be related to said reference value and thereby normalized. Alternatively, it is also possible to normalize the modulated front luminescence emission to the emission of the unprinted areas.

In all described method variants, irradiation is advantageously carried out with a light-emitting diode or laser diode.

The use of an infrared absorbent third feature substance has several advantages compared, for example, to codings formed by substances luminescent in the visible spectral range. The automatic readability of the IR coding is thus only little disturbed by a background print therebelow. Also, soiling is considerably less disturbing in the infrared spectral range than in the visible and the ultraviolet spectral ranges. Also, the signal-to-noise ratio of a measuring head is considerably better in remission measurements than in fluorescence measurements, so that a higher resolution can be obtained.

The described methods involve the advantage that both user groups can carry out not only the authenticity check but also a value recognition on the document without any great additional effort. A further advantage is that the users of the first and second user groups use different feature substances for the authenticity check. Therefore, an analysis of an apparatus for authenticity detection of the second user group, for example, gives no indication of the procedure in the authenticity check of the first user group, since said detection device does not interrogate any of the properties of the second feature substance.

Further embodiments as well as advantages of the invention will be explained hereinafter with reference to the figures. For more clarity, the figures do without a representation that is true to scale and to proportion.

DETAILED DESCRIPTION OF THE PREFERRED EMBODIMENTS

Figure 1:
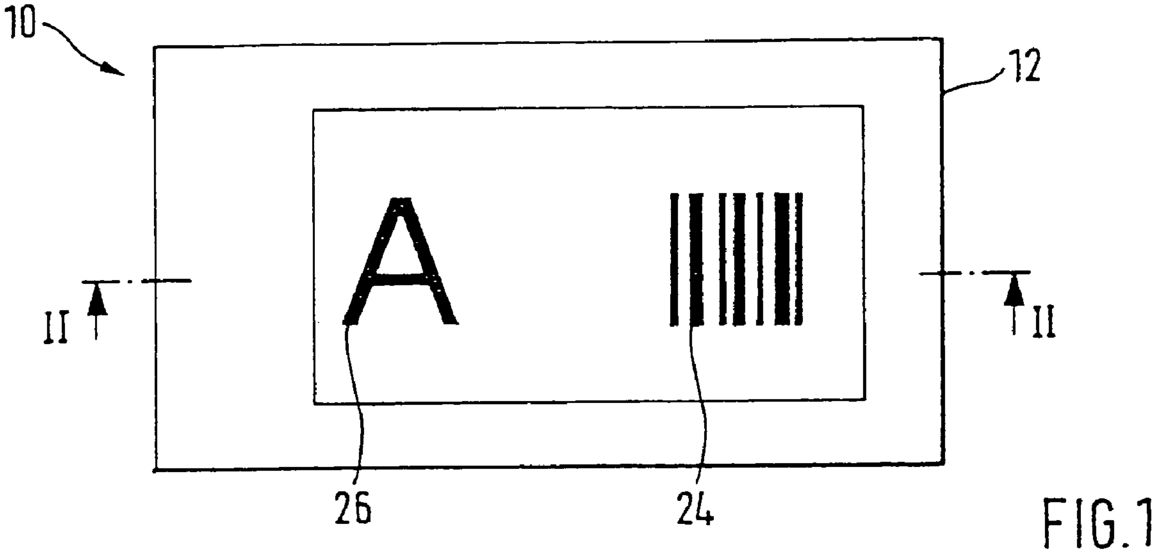
FIG. 1 a schematic representation of a bank note according to one embodiment of the invention, FIG. 2 a section through the bank note of FIG. 1 along the line II-II, FIG. 3 a section of a bank note according to another embodiment of the invention, FIG. 4(*a*) the pattern of the luminescence emission measured on the back of the bank note of FIG. 1 along the line II-II, (*b*) the pattern of the luminescence emission measured on the front of the bank note along the line II-II, FIG. 5 a section of a bank note according to a further embodiment of the invention, and FIG. 6 a back view of the bank note of FIG. 5.
Figure 2:
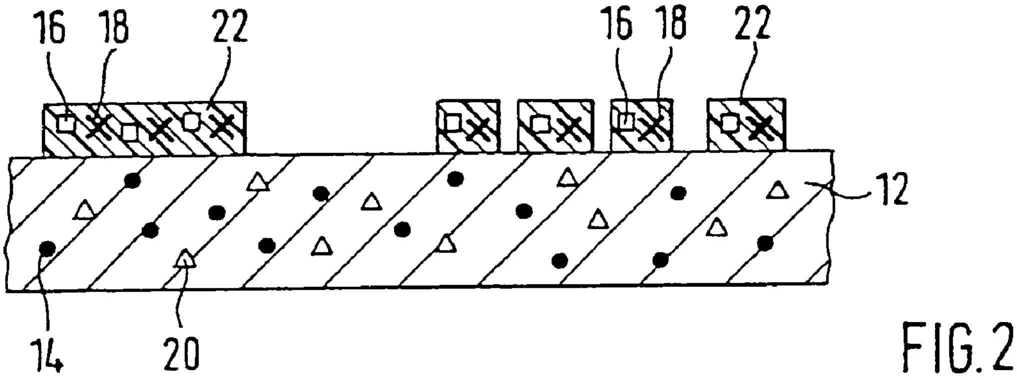

The invention will now be explained by the example of a bank note. FIGS. 1 and 2 show schematic representations of a bank note 10 which is equipped with four different feature substances and permits a check of authenticity and a value recognition by different user groups. FIG. 1 shows the bank note 10 in a plan view and FIG. 2 a cross section along the line II-II of FIG. 1.

As seen best in FIG. 2, two of the feature substances, namely the first feature substance 14 and the fourth feature substance 20, are distributed in the form of particles uniformly within the volume of the paper substrate 12 of the bank note 10. The particles of the first and fourth feature substances 14, 20 can be added to the paper pulp or fibrous pulp before sheet formation or be incorporated into the fibrous matrix only after sheet formation.

In this embodiment, the first feature substance 14 is formed by a luminescent substance based on a rare earth metal doped host lattice and emitting after excitation in the infrared spectral range at wavelengths around 1.5 μm. The fourth feature substance 20 is formed by a mixture of different luminescent substances which, after excitation, emits radiation with a complex and difficult-to-imitate spectral distribution.

A second feature substance 16 and a third feature substance 18 are printed in a printing ink 22 jointly on the front of the bank note 10 and form two different codings 24 and 26. In the embodiment, the first coding 24 is formed by a bar code in which the denomination of the bank note 10 is stored. The second coding 26 is an alphanumeric coding and contains for example the denomination of the bank note 10 in plain text and optionally further encrypted information about the bank note.

The second feature substance 16 is formed for example by a luminescent substance which can be selected specifically so that its luminescence can be excited easily and detected with commercially available detectors. The third feature substance 18 is formed by an infrared absorbent material and is substantially colorless in the visible spectral range.

The authenticity check and the value recognition can now be carried out by two different user groups using different combinations of the four feature substances 14, 16, 18 and 20 or the codings formed thereby. The bank note 10 of the embodiment is designed for a first user group with high security requirements and a second user group with comparatively low security requirements.

The second user group can involve for example simple machines taking bank notes in parking lots, or vending machines. For this use it is particularly expedient to employ inexpensive detection apparatuses for the authenticity check and value recognition.

A user of the second user group checks the authenticity of a bank note 10 by irradiating the bank note with light from the excitation range of the second feature substance 16 and detecting a corresponding luminescence signal. If a correct luminescence signal is received, the bank note is rated as authentic by the user. The presence of the correct luminescence signal suffices here, no spatially resolved evaluation being required. Due to the choice of the luminescent substance 16 this detection can therefore be effected very simply and with commercially available, inexpensive detectors.

If the bank note is recognized as authentic, a user of the second user group can, if required, carry out a value recognition with the help of the coding 24 formed by the infrared absorbent third feature substance 18. For this purpose the bank note is irradiated with infrared radiation in the area of the coding 24, and the transmitted or remitted radiation measured in spatially resolved fashion for example along the line II-II of FIG. 1. The infrared absorption of the third feature substance 18 leads in accordance with the form of the bar code coding 24 to a modulation of the measured signal from which the value of the bank note can be easily determined if the coding scheme is known.

The first user group with its higher security requirements can comprise for example banks, where the authenticity of the bank notes is checked with high-quality and elaborate detectors. The first feature substance 14 with its difficult-to-detect infrared emission at 1.5 μm serves as an authenticity mark for this user group. Alternatively or additionally, the fourth feature substance 20 with its complex spectral emission can be used for the authenticity check.

The value recognition of the bank note is likewise performed by a user of the first user group with the help of the infrared absorbent third feature substance 18 but, in contrast to the second user group, using the alphanumeric coding 26 that is more difficult to read. Simple line scanning does not suffice for reading the alphanumeric coding 26, unlike the bar code 24. Instead, the infrared absorption of the coding 26 must be measured two-dimensionally in spatially resolved fashion and the measured signal subjected to pattern recognition.

The coded information can be present in plain text or be encrypted with a suitable encryption algorithm. The coding 26 can contain the same information as the coding 24, but it can also have other or additional information for the first user group. If the coding 26 contains other information, the users of the first user group can additionally read the coding 24.

The elaborate evaluation of the coding 26 at the same time performs an additional authenticity check of the bank note 10 for the first user group. If an invalid coding is recognized during the value recognition by the coding 26, the bank note can be classified as inauthentic, even if the check of the first feature substance 14 did not show anything unusual.

In a simpler embodiment of the bank note, the second coding 26 can also be lacking. The first and second user groups then use the comparatively easy-to-read coding 24 for value recognition. The high-quality authenticity check by the first or fourth feature substance 14 or 20 at the same time guarantees the first user group the correctness of the value of the bank note read with the help of the infrared absorption.

Figure 3:
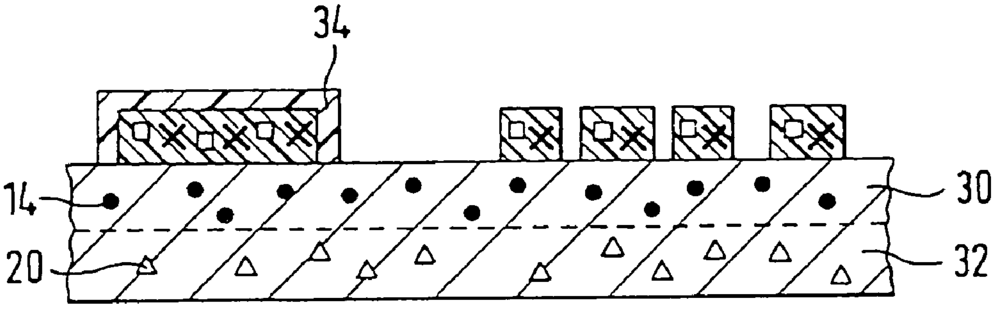

FIG. 3 shows a further embodiment of the invention. In this embodiment, the paper substrate 12 has two separately produced, connected paper layers 30 and 32. The first feature substance 14 was incorporated into the paper layer 30 during papermaking, the second feature substance 20 into the paper layer 32. It is also possible that one of the paper layers, for example the layer 30, contains both feature substances while the other paper layer is not provided with a feature substance.

In the embodiment of FIG. 3, the alphanumeric coding 26 is additionally overprinted with a printed layer 34 which is opaque in the visible spectral range, but transparent or translucent in the absorption range of the third feature substance 18. The printed layer then hides the presence of the third feature substance 18 in the visible spectral range, but permits detection of its infrared absorption by the users of the first user group.

A further variant of the value recognition on the bank note 10 shown in FIGS. 1 and 2 by a user of the first user group will now be explained in connection with FIG. 4. For this variant, the first feature substance 14 selected is a luminescent substance which emits in the absorption range of the third feature substance 18.

Figure 4A:
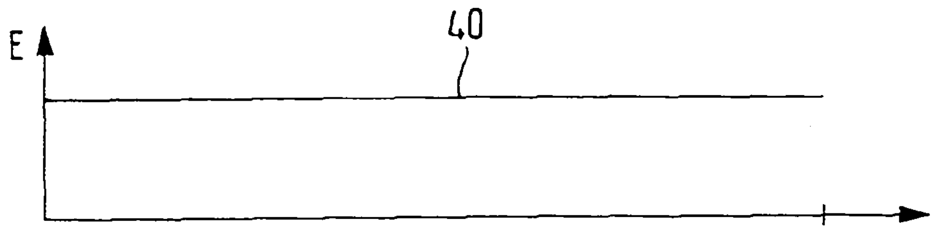
Figure 4B:
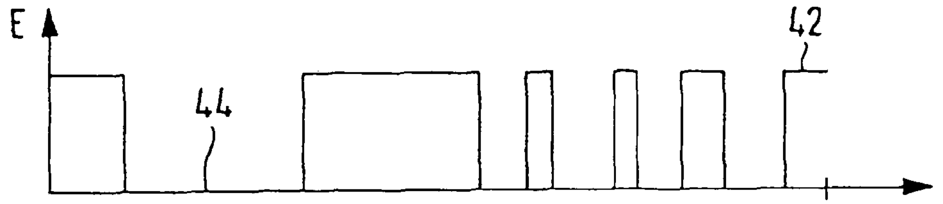

FIG. 4(*a*) shows the pattern 40 of the luminescence emission measured on the back of the bank note 10, along the line II-II after excitation of the first feature substance 14. Since the first feature substance 14 is distributed uniformly within the substrate 12 and the back of the bank note does not contain any absorbent structures, there is a largely constant emission signal 40 whose magnitude can serve as a reference value for the subsequent measurement on the front of the bank note. If the luminescence emission is measured along the line II-II on the front of the bank note 10, the result is approximately the pattern 42 shown in FIG. 4(*b*). At the places where the line II-II crosses the codings 24 or 26, gaps 44 or dips result in the measured luminescence pattern 42 due to the absorption by the third feature substance 18. Altogether, the information contained in the codings 24 or 26 can thus be read by an indirect measurement of the IR absorption. Since an interactive effect of the properties of the first and third marking substances is used for the readout operation, the security feature is very difficult for third parties to imitate.

Figure 5:
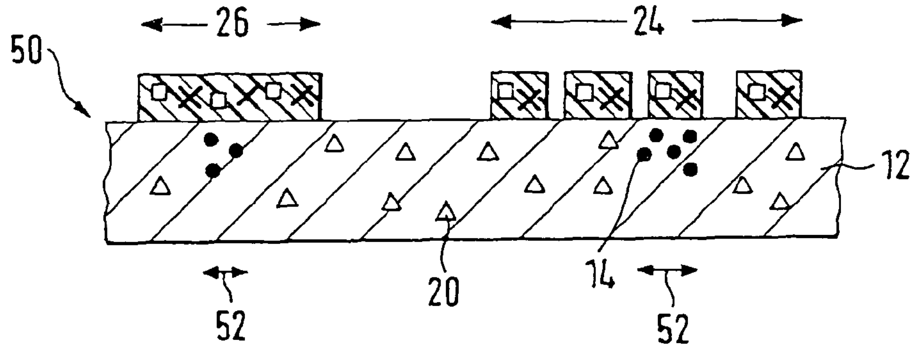
Figure 6:
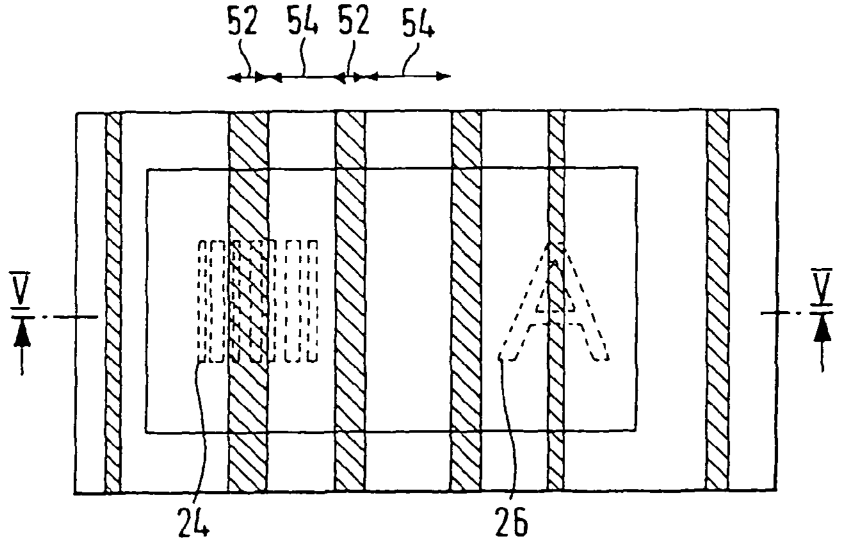

A further embodiment of the invention is shown in FIGS. 5 and 6. The bank note 50 has, like the bank note 10 of FIGS. 1 and 2, first and second codings 24, 26 which are printed on the front of the bank note with a printing ink 22 containing a luminescent substance and an infrared absorbent marking substance. In the paper substrate 12, however, in contrast to the bank note of FIGS. 1 and 2, only the fourth marking substance 20 is distributed uniformly within the paper substrate 12.

As seen best in a joint viewing of FIG. 5 with the back view of FIG. 6, the luminescent first feature substance 14 is incorporated in the near-surface area of the paper substrate 12 in the form of stripes 52 extending over the total surface of the bank note. The width of the individual stripes 52 and the width of the particular spaces 54 form a bar code in which any information about the bank note 10, for example the denomination and currency, is stored in encrypted form.

The bar code 52, 54 can be read by irradiating the back of the bank note with excitation light and measuring the luminescence emission of the first feature substance 14 along the line V-V. In the embodiment, the excitation ranges of the first and second marking substances are selected to be nonoverlapping, so that the readout of the bar code 52, 54 and the authenticity check on the basis of the second marking substance do not disturb each other.

The invention claimed is:

1. A value document, comprising a value document substrate and at least three different feature substances for checking the value document, wherein the value document of a series has a first feature substance, and second and third feature substances are provided on the value document substrate in a printing ink jointly, the second feature substance comprising a luminescent substance and the third feature substance comprising a material absorbent in a selected spectral range, wherein an upgrade of the value document of the series in addition to or instead of the first feature substance comprises a fourth feature substance.

2. The value document according to claim 1, wherein the first and/or fourth feature substance is/are incorporated into the volume of the substrate of the value document.

3. The value document according to claim 2, wherein the first and/or fourth feature substance is/are distributed substantially uniformly within the volume of the value document substrate.

4. The value document according to claim 1, wherein the third feature substance absorbs in the infrared spectral range.

5. The value document according to claim 4, wherein the third feature substance is substantially colorless or has only weak inherent color in the visible spectral range.

6. The value document according to claim 4, wherein the third feature substance absorbs significantly in the spectral range above about 1.2 μm.

7. The value document according to claim 6, wherein the spectral range is from about 1.5 μm to 2.2 μm.

8. The value document according to claim 4, wherein the third feature substance has no significant absorption at a wavelength of about 0.8 μm.

9. The value document according to claim 4, wherein the third feature substance is present in the printing ink in particle form with an average particle size smaller than 50 nm.

10. The value document according to claim 4, wherein the first and/or fourth feature substance is formed by a luminescent substance which emits in the absorption range of the third feature substance.

11. The value document according to claim 1, wherein the third feature substance comprises a doped semiconductor material or a metal oxide.

12. The value document according to claim 1, wherein the first and/or fourth feature substance is formed either or both by a luminescent substance and a mixture of luminescent substances.

13. The value document according to claim 1, wherein at least one of the feature substances is formed on the basis of a host lattice doped with rare earth elements.

14. The value document according to claim 1, wherein the first and/or fourth feature substance is printed on the value document substrate.

15. The value document according to claim 1, wherein the first and/or fourth feature substance is applied to or incorporated in the value document substrate in the form of a coding.

16. The value document according to claim 15, wherein at least one coding extends over a predominant part of a surface of the value document.

17. The value document according to claim 15, wherein at least one coding is a bar code.

18. The value document according to claim 15, wherein at least one coding represents information about the value document.

19. The value document according to claim 18, wherein the information is in encrypted form.

20. The value document according to claim 1, wherein the second and third feature substances are printed on the value document substrate in the form of a coding.

21. The value document according to claim 1, wherein the value document substrate comprises one or both of a printed or unprinted cotton paper and a paper consisting of a cotton/synthetic fiber mixture.

22. The value document according to claim 1, wherein the value document substrate comprises a printed or unprinted plastic film.

23. The value document according to claim 1, wherein the value document has a further printed layer which partly or completely covers the value document areas provided with the second and third feature substances.

24. The value document according to claim 23, wherein the further printed layer is opaque in the visible spectral range and is transparent or translucent in the emission range of at least one of the second feature substance and the absorption range of the third feature substance.

25. A method for producing a value document, comprising;

providing a value document having a value document substrate and at least three different feature substances for checking the value document, the value document of a series having a first feature substance, the second feature substance including a luminescent substance and the third feature substance including a material absorbent in a selected spectral range, wherein an upgrade of the value document of the series in addition to or instead of the first feature substance comprises a fourth feature substance; and applying the second and third feature substances to the value document substrate in a printing ink jointly.

26. The production method according to claim 25, wherein at least one of the first and fourth feature substance is incorporated into the volume of the substrate of the value document.

27. A method for checking or processing a value document, comprising:

providing a value document having a value document substrate and at least three different feature substances for checking the value document, the value document of a series having a first feature substance, the second feature substance including a luminescent substance and the third feature substance including a material absorbent in a selected spectral range, wherein an upgrade of the value document of the series in addition to or instead of the first feature substance comprises a fourth feature substance; and checking the authenticity of the value document and carrying out a value recognition of the document by using at least one characteristic property of at least one of the first, second and fourth feature substance for checking the authenticity of the value document, and the absorption of the third feature substance for the value recognition of the value document, wherein the presence of the fourth feature substance indicates the value document to be an upgrade of the series.

28. The method according to claim 27, including using at least one characteristic property of the first feature substance for checking the authenticity of the value document, and the absorption of the third feature substance for the value recognition of the value document, by a user of a first user group.

29. The method according to claim 28, wherein at least one characteristic property of the second feature substance is used for checking the authenticity of the value document, and the absorption of the third feature substance for the value recognition of the value document, by a user of a second user group.

30. The method according to claim 29, wherein, for the authenticity check by a user of the second user group, the second feature substance is irradiated with radiation from its excitation range, the emission is determined at at least one wavelength from the emission range of the second feature substance, and the check of authenticity is carried out on the basis of the determined emission.

31. The method according to claim 30, wherein the second feature substance is irradiated with at least one of visible and infrared radiation, and its emission is determined in the infrared spectral range.

32. The method according to claim 27 or 28, wherein, for value recognition, at least a partial area of the value document is irradiated with radiation from the absorption range of the third feature substance, the absorption of the third feature substance is determined in the partial area at a wavelength from the irradiation range, and the value recognition is carried out on the basis of the determined absorption.

33. The method according to claim 32, wherein the irradiation is effected in the infrared spectral range.

34. The method according to claim 32, wherein the determination of the absorption is performed in spatially resolved fashion.

35. The method according to claim 32, wherein the irradiation is performed with a light-emitting diode or laser diode.

36. The method according to claim 27 or 28, wherein, for value recognition, at least a partial area of the value document is irradiated with radiation from the excitation range of the luminescent first and/or fourth feature substance, the emission of the first and/or fourth feature substance is determined at a wavelength from the absorption range of the third feature substance, and the value recognition is carried out on the basis of the determined emission.

37. The method according to claim 36, wherein the irradiation is effected in the infrared spectral range.

38. The method according to claim 36, wherein the determination of the emission is performed in spatially resolved fashion.

39. The method according to claim 36, wherein the emission of at least one of the first and fourth feature substance is determined on opposite sides of the value document.

40. The method according to claim 39, wherein the value recognition is performed on the basis of a comparison of the emission determined on opposite sides.

* * * * *